(12) United States Patent
Sylla (10) Patent No.: US 9,837,900 B2
(45) Date of Patent: Dec. 5, 2017

(54) APPARATUS FOR VOLTAGE CONVERSION AND ONBOARD ELECTRICAL SYSTEM HAVING SAID APPARATUS

(71) Applicant: Continental Automotive GmbH, Hannover (DE)

(72) Inventor: Sven Sylla, Regenstauf (DE)

(73) Assignee: CONTINENTAL AUTOMOTIVE GMBH, Hannover (DE)

( * ) Notice: Subject to any disclaimer, the term of this patent is extended or adjusted under 35 U.S.C. 154(b) by 8 days.

(21) Appl. No.: 14/435,244

(22) PCT Filed: Sep. 4, 2013

(86) PCT No.: PCT/EP2013/068246
§ 371 (c)(1),
(2) Date: Aug. 12, 2015

(87) PCT Pub. No.: WO2014/056661
PCT Pub. Date: Apr. 17, 2014

(65) Prior Publication Data
US 2015/0349638 A1 Dec. 3, 2015

(30) Foreign Application Priority Data
Oct. 11, 2012 (DE) .......... 10 2012 218 543

(51) Int. Cl.
*H02M 3/15* (2006.01)
*H02M 3/158* (2006.01)
(Continued)

(52) U.S. Cl.
CPC .......... *H02M 3/158* (2013.01); *B60L 11/18* (2013.01); *H02M 3/1584* (2013.01); *H02M 2001/009* (2013.01)

(58) Field of Classification Search
CPC .......... H02M 3/158; H02M 2001/008; H02M 2001/009; Y10T 307/582
(Continued)

(56) References Cited

U.S. PATENT DOCUMENTS 7,616,467 B2  11/2009  Mallwitz ............... 363/132
2002/0000243 A1*  1/2002  Ganz ............... B60H 1/00428
136/244
(Continued)

FOREIGN PATENT DOCUMENTS

DE          3316251 A1    11/1984   ........... H02M 3/155
DE     202010007787 U1     9/2011   ........... H02M 3/156
(Continued)

OTHER PUBLICATIONS

Durán-Gómez, J.L. et al., "Analysis and Evaluation of a Series-Combined Connected Boost and Buck-Boost DC-DC Converter for Photovoltaic Application," Applied Power Electronics Conference and Exposition, IEEE, pp. 979-985 (7 pages), Mar. 19, 2006.
(Continued)

*Primary Examiner* — Daniel Kessie
(74) *Attorney, Agent, or Firm* — Slayden Grubert Beard PLLC (57) ABSTRACT

A device for voltage conversion includes a first, transformerless direct voltage converter unit having a first output potential connection and a second transformerless direct voltage converter unit having a second output potential connection. The two direct voltage converter units have a common input potential connection and a common reference potential connection. The first direct voltage converter unit generates, from the input voltage potential, a first output voltage potential on the first output potential connection, which has a higher voltage potential value relative to the reference voltage potential. The second direct voltage con-
(Continued)

verter unit generates, from the input voltage potential, a second output voltage potential on the second output potential connection, which has a lower voltage potential value relative to the reference voltage potential. The device can be cost-effectively produced and provides sufficient safety.

13 Claims, 1 Drawing Sheet

(51) Int. Cl.
*B60L 11/18* (2006.01)
*H02M 1/00* (2006.01)

(58) Field of Classification Search
USPC .................. 307/10.1, 9.1; 363/34, 35, 65
See application file for complete search history.

(56) References Cited

U.S. PATENT DOCUMENTS

| | | | |
|---|---|---|---|
| 2008/0174287 A1 | 7/2008 | Park | 323/271 |
| 2008/0266919 A1* | 10/2008 | Mallwitz | H02M 3/158 363/124 |
| 2012/0042588 A1* | 2/2012 | Erickson, Jr. | H01L 31/02021 52/173.3 |
| 2012/0112684 A1 | 5/2012 | Xu et al. | 320/101 |
| 2014/0063883 A1* | 3/2014 | Familiant | H02M 1/38 363/131 |
| 2014/0070785 A1* | 3/2014 | Galloway | H02M 3/1582 323/285 |

FOREIGN PATENT DOCUMENTS

| | | | |
|---|---|---|---|
| EP | 1971018 A1 | 9/2008 | ............ H02M 3/158 |
| JP | 2007104285 A | 4/2007 | ............ H02M 1/14 |
| JP | 2007104899 A | 4/2007 | ................ B60L 9/18 |
| JP | 2010207068 A | 9/2010 | ............ H02M 3/155 |
| WO | 2014/056661 A2 | 4/2014 | ............ H02M 3/158 |

OTHER PUBLICATIONS

International Search Report and Written Opinion, Application No. PCT/EP2013/068246, 18 pages, Apr. 22, 2014.
European Office Action, Application No. 13756179.1, 15 pages, dated Nov. 7, 2016.

\* cited by examiner

US 9,837,900 B2

APPARATUS FOR VOLTAGE CONVERSION AND ONBOARD ELECTRICAL SYSTEM HAVING SAID APPARATUS

CROSS-REFERENCE TO RELATED APPLICATIONS

This application is a U.S. National Stage Application of International Application No. PCT/EP2013/068246 filed Sep. 4, 2013, which designates the United States of America, and claims priority to DE Application No. 10 2012 218 543.7 filed Oct. 11, 2012, the contents of which are hereby incorporated by reference in their entirety.

TECHNICAL FIELD

The present invention relates to an apparatus for voltage conversion and to an onboard electrical system having said apparatus. In addition, the invention relates to a vehicle having said onboard electrical system.

BACKGROUND

Apparatuses for voltage conversion of the type in question can be used in almost all electrical systems in which different system voltages are present and, according to function, a system voltage is transformed into another system voltage. An example of said systems is an onboard electrical system on a hybrid or electric vehicle. An onboard electrical system of this kind normally comprises two or more onboard electrical system branches that each have an onboard electrical system voltage, wherein the onboard electrical system voltages of different onboard electrical system branches have different voltage values. In this case, a first onboard electrical system branch comprises loads with low power consumption, such as a navigation appliance, which are supplied with a 12 volt onboard electrical system voltage. This first onboard electrical system branch is then referred to as the low voltage onboard electrical system branch by way of example. A second onboard electrical system branch comprises loads with high power consumption, such as an electric motor that is used as a starter for the internal combustion engine or as a drive for the vehicle. This second onboard electrical system branch is normally predominated by a comparatively high onboard electrical system voltage that is 100 volts or higher. This second onboard electrical system branch is then called the high voltage onboard electrical system branch by way of example. Between these two onboard electrical system branches, a flow of current often takes place in order to protect the second onboard electrical system branch from a harmful voltage dip, for example in the event of an abruptly rising power requirement, by connecting a powerful load in said second onboard electrical system branch. To this end, the onboard electrical system has an apparatus for voltage conversion that transforms the onboard electrical system voltage of the first onboard electrical system branch into the other onboard electrical system voltage of the second onboard electrical system branch.

Like many other electrical systems, the onboard electrical system of a vehicle is subject to a strict safety requirement to prevent, as far as possible, dangerous body currents that arise between two electrical connections at a contact voltage of above 60 V. To observe this safety requirement, the apparatus for voltage conversion for an onboard electrical system is normally equipped with transformers that provide DC isolation between the onboard electrical system branches. As a result of this DC isolation, no current can flow between the electrical connections of different onboard electrical system branches, namely between the connections on the input side and the connections on the output side of the apparatus. Therefore, there is also no voltage between the electrical connections of different onboard electrical system branches that could exceed the maximum permitted contact voltage. However, such apparatuses have a disadvantage in that they are expensive on account of the transformers with a DC isolation function.

SUMMARY

One embodiment provides an apparatus for voltage conversion, comprising a first transformerless DC voltage transformer unit having a first output potential connection for providing a first output voltage potential, a second transformerless DC voltage transformer unit having a second output potential connection for providing a second output voltage potential; wherein the first and the second DC voltage transformer unit have a shared input potential connection for applying an input voltage potential, and a shared reference-ground potential connection for applying a reference-ground voltage potential; wherein the first DC voltage transformer unit takes the input voltage potential and produces a first output voltage potential at the first output potential connection, wherein the first output voltage potential has a higher voltage potential value with reference to the reference-ground voltage potential, and wherein the second DC voltage transformer unit takes the input voltage potential and produces a second output voltage potential at the second output potential connection, wherein the second output voltage potential has a lower voltage potential value with reference to the reference-ground voltage potential.

In a further embodiment, the first DC voltage transformer unit comprises an up-converter.

In a further embodiment, the second DC voltage transformer unit comprises an inverse converter.

In a further embodiment, the first DC voltage transformer unit comprises a first coil and a first controllable switch in a series circuit between the input potential connection and the reference-ground potential connection, the first coil and a second controllable switch being in a series circuit between the input potential connection and the first output potential connection, and the first controllable switch and the second controllable switch being in a series circuit, and wherein a first capacitor is connected in parallel with the series circuit formed by the first and the second switch, between the reference-ground potential connection and the first output potential connection.

In a further embodiment, the second DC voltage transformer unit comprises a third controllable switch and a second coil in a series circuit between the input potential connection and the reference-ground potential connection, the third controllable switch and a fourth controllable switch being in a series circuit between the input potential connection and the second output potential connection, and the second coil and the fourth controllable switch being in a series circuit, and wherein a second capacitor is connected in parallel with the series circuit formed by the second coil and the fourth controllable switch, between the reference-ground potential connection and the second output potential connection.

In a further embodiment, the apparatus comprises a first signal input connection for receiving a first pulse-width-modulated control signal for actuating the first and the second switch.

In a further embodiment, the first or the second switch has a first control signal connection, and the apparatus has a first inverter for inverting the first control signal between the first signal input connection and the first control signal connection.

In a further embodiment, the apparatus comprises a second signal input connection for receiving a second pulse-width-modulated control signal for actuating the third and the fourth switch. In a further embodiment, the third or the fourth switch has a second control signal connection, and the apparatus has a second inverter for inverting the second control signal between the second signal input connection and the second control signal connection.

Another embodiment provides an onboard electrical system for a vehicle, wherein the onboard electrical system comprises: a first onboard electrical system branch at a first onboard electrical system voltage, a second onboard electrical system branch at a second onboard electrical system voltage, an apparatus for converting the first onboard electrical system voltage into the second onboard electrical system voltage and/or vice versa, wherein the apparatus comprises: a first transformerless DC voltage transformer unit having a first output potential connection for providing a first output voltage potential, a second transformerless DC voltage transformer unit having a second output potential connection for providing a second output voltage potential; wherein the first and the second DC voltage transformer unit have a shared input potential connection for applying an input voltage potential, and a shared reference-ground potential connection for applying a reference-ground voltage potential; wherein the first DC voltage transformer unit takes the input voltage potential and produces a first output voltage potential at the first output potential connection, wherein the first output voltage potential has a higher voltage potential value with reference to the reference-ground voltage potential, and wherein the second DC voltage transformer unit takes the input voltage potential and produces a second output voltage potential at the second output potential connection, wherein the second output voltage potential has a lower voltage potential value with reference to the reference-ground voltage potential, wherein the first onboard electrical system voltage is applied between the input potential connection and the reference-ground potential connection, and wherein the second onboard electrical system voltage is applied between the first output potential connection and the second output potential connection.

In a further embodiment, the onboard electrical system further comprises a first energy store between the first output potential connection and the reference-ground potential connection, and a second energy store between the reference-ground potential connection and the second output potential connection, wherein the first DC voltage transformer unit is configured to regulate the charge voltage of the first energy store, and wherein the second DC voltage transformer unit is configured to regulate the charge voltage of the second energy store.

Another embodiment provides a vehicle comprising an onboard electrical system as disclosed above.

DETAILED DESCRIPTION

Embodiments of the present invention is to provide an option for inexpensive voltage conversion that nevertheless affords adequate safety.

Some embodiments provide an apparatus for voltage conversion that comprises a first transformerless DC voltage transformer unit having a first output potential connection for providing a first output voltage potential, and a second transformerless DC voltage transformer unit having a second output potential connection for providing a second output voltage potential. The first and second output potential connections are simultaneously the two output-side connections of the apparatus. The first and second DC voltage transformer units have a shared input potential connection for applying a shared input voltage potential and a shared reference-ground potential connection for applying a shared reference-ground voltage potential. The shared input potential connection and the shared reference-ground potential connection are simultaneously the two input-side connections of the apparatus. The first DC voltage transformer unit takes the input voltage potential applied to the input potential connection and produces a first output voltage potential at the first output potential connection, wherein the first output voltage potential has a higher voltage potential value with reference to the reference-ground voltage potential at the reference-ground potential connection. Similarly, the second DC voltage transformer unit takes the same input voltage potential and produces a second output voltage potential at the second output potential connection, wherein the second output voltage potential has a lower voltage potential value with reference to the same reference-ground voltage potential.

In this case, the difference between the first and second output voltage potentials forms the output voltage for the apparatus between the first and second output potential connections or between the two output-side connections of the apparatus.

In this context, the term "transformerless" means that the apparatus, or the first and second DC voltage transformer units of the apparatus, has/have no transformer, or no DC isolation between the input potential connection and the first output potential connection, between the input potential connection and the second output potential connection, between the reference-ground potential connection and the first output potential connection, and/or between the reference-ground potential connection and the second output potential connection, as a result of a transformer.

A "shared potential connection" means a shared electrical node at the same voltage potential in a circuit topology of the apparatus.

Hence, an apparatus for voltage conversion is provided that has no transformer, or no DC isolation as a result of a transformer, and hence can be produced inexpensively. In addition, appropriate refinement allows the aforementioned safety requirement to be met. Since a higher output voltage potential in relation to the input voltage potential and the reference-ground voltage potential and a lower output voltage potential in relation to the input voltage potential and the reference-ground voltage potential can be produced at the same time, it is theoretically possible for an output voltage of up to 120 volts to be provided, for example, without infringing the aforementioned safety requirement with a maximum contact voltage of 60 volts.

According to one embodiment, the first DC voltage transformer unit is in the form of an up-converter. This has the advantage that the cited apparatus can be used to produce the first output voltage potential, which has a higher voltage potential value than the input voltage potential, in a simple manner.

According to a further a embodiment, the second DC voltage transformer unit is in the form of an inverse converter. This has the advantage that the cited apparatus can be used to produce the second output voltage potential, which has a negative voltage potential value in relation to the input voltage potential and hence in comparison with the first output voltage potential, in a simple manner.

Together, the two aforementioned embodiments may provide the advantage that the output voltage of the apparatus, which is a potential difference between the first and second output voltage potentials, can have a higher voltage value in comparison with a potential difference between the first output voltage potential and the input voltage potential or between the second output voltage potential and the input voltage potential. Hence, the apparatus can attain a higher voltage gain overall for the voltage conversion in transformerless fashion using simple and inexpensive means.

According to a further embodiment, the first DC voltage transformer unit has a first coil and a first controllable switch in a series circuit between the input potential connection and the reference-ground potential connection. The first DC voltage transformer unit has the first coil and a second controllable switch in a series circuit between the input potential connection and the first output potential connection. The first DC voltage transformer unit has the first and second controllable switches in a series circuit, and a first capacitor connected in parallel with the series circuit formed by the first and second switches, between the reference-ground potential connection and the first output potential connection.

According to a further embodiment, the second DC voltage transformer unit has a third controllable switch and a second coil in a series circuit between the input potential connection and the reference-ground potential connection. The second DC voltage transformer unit has the third controllable switch and a fourth controllable switch in a series circuit between the input potential connection and the second output potential connection. The second DC voltage transformer unit has the second coil and the fourth controllable switch in a series circuit, and a second capacitor connected in parallel with the series circuit formed by the second coil and the fourth controllable switch, between the reference-ground potential connection and the second output potential connection.

The last two embodiment may provide the advantage that the apparatus can be produced from a simple circuit using inexpensive standardized components.

According to a further embodiment, a first diode can be used instead of the second switch and a second diode can be used instead of the fourth switch. In this case, the first diode is arranged between the first coil and the first output potential connection, and so as to conduct in the direction from the first coil to the first output potential connection and to block the other way around. The second diode is arranged between the third controllable switch and the second output potential connection, and so as to conduct in the direction from the second output potential connection to the third controllable switch and to block the other way around.

Compared to the use of the first and second diodes, the use of the second and fourth switches affords the advantage that flows of current from the first coil to the first capacitor and from the second coil to the second capacitor can be produced and interrupted more quickly.

According to a further embodiment, the apparatus additionally has a first signal input connection for receiving a first pulse-width-modulated control signal for actuating the first and second switches. In this case, the first or the second switch is provided with a first control signal connection. In addition, a first inverter for inverting the first control signal is provided between the first signal input connection and the first control signal connection.

According to a further embodiment, the apparatus additionally similarly has a second signal input connection for receiving a second pulse-width-modulated control signal for actuating the third and fourth switches. In this case, the third or the fourth switch is provided with a second control signal connection. In addition, a second inverter for inverting the second control signal is provided between the second signal input connection and the second control signal connection.

The last two embodiments provide an apparatus in which the first and second DC voltage transformer units each have a first and a second adjustable voltage gain factor. The first and second voltage gain factors are adjusted in this case by changing the duty factor of the respective first and second, pulse-width-modulated control signals.

The last two embodiments may provide the advantage that the output voltage potentials can be changed at any time, given a constant input voltage potential and when needed, by simply changing the duty factors of the pulse-width modulated control signals.

According to a further embodiment, the first and second control signals are one and the same pulse-width-modulated control signal. Thus, the four switches can be actuated at the same time with just one control signal.

This provides an apparatus that, according to one embodiment, is capable of taking an input voltage of 12 volts, for example, and producing an output voltage of over 100 volts between the first and second output potential connections, without in so doing infringing the aforementioned safety requirement.

In this case, the first DC voltage transformer unit can provide a first output voltage potential that, in relation to the input voltage potential and the reference-ground voltage potential, has a higher potential value in relation to the maximum permitted contact voltage of 60 volts. To this end, the first pulse-width-modulated control signal can have a duty factor of 4/5, for example, in order to set the first voltage gain factor to a voltage gain of 5 and hence to take the input voltage potential of 12 volts and produce a first output voltage potential with a voltage potential value of 60 volts. If the reference-ground potential connection is at ground potential and if the input voltage potential is 12 volts with reference to the ground potential, the first DC voltage transformer unit can take the input voltage potential and a first voltage gain factor of 5, which can be set by means of the first control signal, and provide a first output voltage potential of 60 volts (first output voltage potential=input voltage potential×first voltage gain factor=12 volts×5=60 volts). In this case, the potential differences between the first output potential connection and the input potential connection and between the first output potential connection and the reference-ground potential connection are below or equal to the maximum permitted contact voltage of 60 volts (|first output voltage potential−input voltage potential|=|60 volts−12 volts|=48 volts; |first output voltage potential reference-ground voltage potential|=|60 volts−0 volt|=60 volts).

Similarly, the second DC voltage transformer unit can provide a second output voltage potential that, in relation to the input voltage potential and the reference-ground voltage potential, has a lower potential value in relation to the maximum permitted contact voltage of 60 volts. To this end, the second pulse-width-modulated control signal can likewise have a duty factor of 4/5, for example, in order to set the second voltage gain factor to a factor value of −4 and to take the input voltage potential of 12 volts and produce a second output voltage potential with a voltage potential value of −48 volts. Given the reference-ground voltage potential of 0 volt and the input voltage potential of 12 volts, the second DC voltage transformer unit can take the input voltage potential and a second voltage gain factor of −4, which can be set by means of the second control signal, and provide a second output voltage potential of −48 volts (second output voltage potential=input voltage potential× second voltage gain factor=12 volts×−4=−48 volts). In this case, the potential differences between the second output potential connection and the input potential connection and between the second output potential connection and the reference-ground potential connection are likewise below or equal to the maximum permitted contact voltage of 60 volts (|second output voltage potential−input voltage potential|=|−48 volts 12 volts|=−60 volts; |second output voltage potential reference-ground voltage potential|=|−48 volts−0 volt|=−48 volts). In this case, voltage gain factor of −4 means that the second DC voltage transformer unit boosts the input voltage potential fourfold and outputs the boosted voltage potential in inverted form to the second output potential connection.

Since the output voltage of the apparatus is the potential difference between the first and second output voltage potentials, an output voltage from the apparatus at 108 volts (|first output voltage potential−second output voltage potential|=|60 volts−(−48 volts)|=108 volts) is thus obtained from the difference between the first and second output voltage potentials. At the same time, the aforementioned safety requirement is met, since the potential differences between the input potential connection and the first output potential connection, between the input potential connection and the second output potential connection, between the reference-ground potential connection and the first output potential connection and between the reference-ground potential connection and the second output potential connection do not exceed the maximum permitted contact voltage of 60 volts.

Other embodiments provide an onboard electrical system for a vehicle that comprises a first onboard electrical system branch at a first onboard electrical system voltage and a second onboard electrical system branch at a second onboard electrical system voltage and also an apparatus as described above. In this case, the first onboard electrical system voltage of the first onboard electrical system branch is applied between the input potential connection and the reference-ground potential connection of the first and second DC voltage transformer units. The second onboard electrical system voltage of the second onboard electrical system branch is applied between the first output potential connection of the first DC voltage transformer unit and the second output potential connection of the second DC voltage transformer unit.

According to one embodiment, the onboard electrical system has a first energy store between the first output potential connection and the reference-ground potential connection and a second energy store between the reference-ground potential connection and the second output potential connection. In this case, the first DC voltage transformer unit is designed to regulate the charge voltage of the first energy store. Similarly, the second DC voltage transformer unit is designed to regulate the charge voltage of the second energy store. The first DC voltage transformer unit is thus designed such that it regulates the charge voltage of the first energy store, and hence protects the first energy store from overcharging, in the manner of a balancer. Similarly, the second DC voltage transformer unit is designed such that it likewise regulates the charge voltage of the second energy store, and hence protects the second energy store from overcharging, in the manner of a balancer.

The two energy stores are used to provide electric power for the onboard electrical system or for the electrical loads in the onboard electrical system. The separate arrangement of the two energy stores between the first output potential connection and the reference-ground potential connection and between the reference-ground potential connection and the second output potential connection, respectively, has the advantage that the charge voltages of the two energy stores can be regulated independently of one another by the respective DC voltage transformer units.

Other embodiments provide a vehicle having an onboard electrical system as described above.

Embodiments of the apparatus described above, insofar as they are otherwise transferable to the aforementioned onboard electrical system or the aforementioned vehicle, can also be regarded as embodiments of the onboard electrical system or the vehicle.

Figure 1:
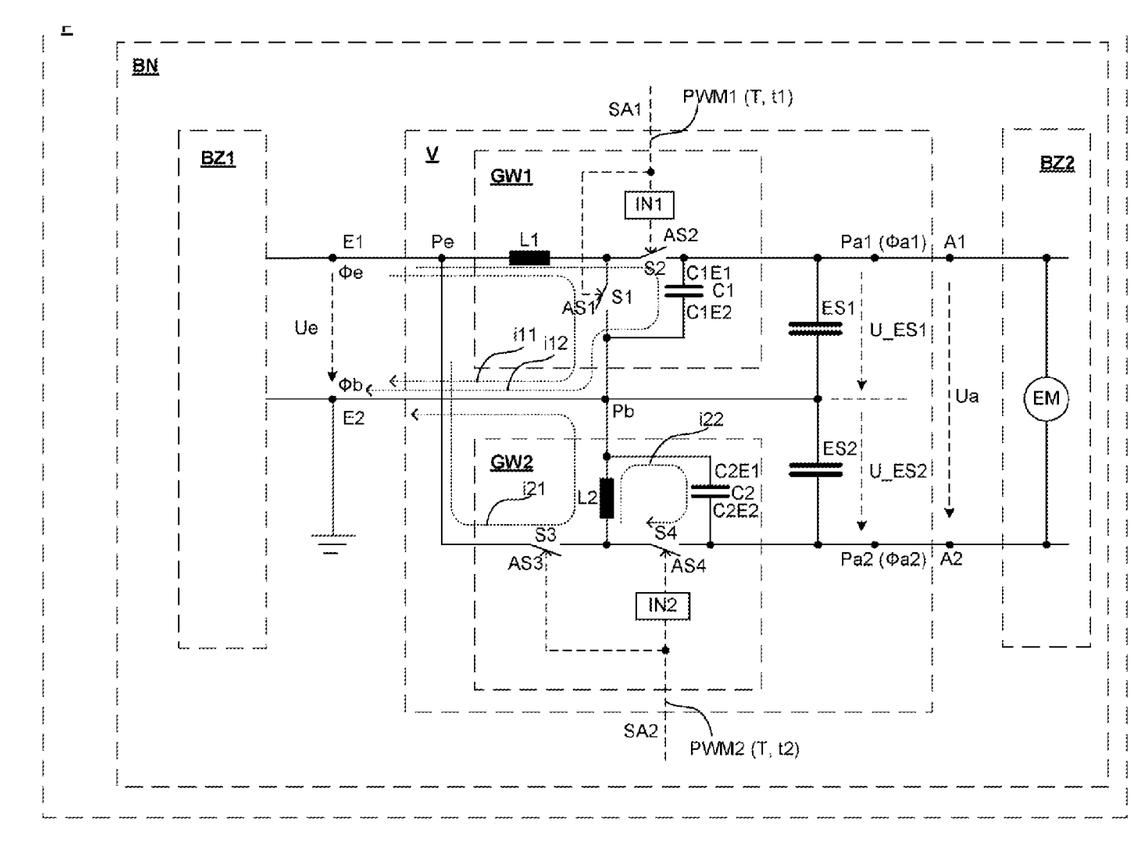
FIG. 1 shows a schematic illustration of a hybrid vehicle with an onboard electrical system having an apparatus according to one embodiment of the invention.

With reference to FIG. 1, the vehicle F comprises an onboard electrical system BN having a first onboard electrical system branch BZ1 and a second onboard electrical system branch BZ2, and also an apparatus V for voltage conversion. The first onboard electrical system branch BZ1 has a first onboard electrical system voltage Ue that has a rated voltage value of 12 volts. The second onboard electrical system branch BZ2 comprises an electric motor EM as a system load and has a second onboard electrical system voltage Ua. The second onboard electrical system voltage Ua has a rated voltage value of 100 volts, which is necessary for the operation of the electric motor EM. Arranged between the first and second onboard electrical system branches BZ1, BZ2 is the apparatus V, which converts the first onboard electrical system voltage Ue of the first onboard electrical system branch BZ1 into the second onboard electrical system voltage Ua of the second onboard electrical system branch BZ2 and/or vice versa.

The apparatus V has a first input-side voltage connection E1 and a second input-side voltage connection E2 and is electrically connected to the first onboard electrical system branch BZ1 via these two input-side voltage connections E1 and E2. In addition, the apparatus has a first output-side voltage connection A1 and a second output-side voltage connection A2 and is electrically connected to the second onboard electrical system branch BZ2 via these two output-side voltage connections A1 and A2.

The first onboard electrical system voltage Ue is therefore present between the two input-side voltage connections E1 and E2 of the apparatus V. Similarly, the second onboard electrical system voltage Ua is present between the two output-side voltage connections A1 and A2 of the apparatus V. Hence, the first onboard electrical system voltage Ue corresponds to the input voltage of the apparatus V and the second onboard electrical system voltage Ua corresponds to the output voltage of the apparatus V.

Furthermore, the apparatus V has a first signal input connection SA1 and a second signal input connection SA2 for receiving a first and a second pulse-width-modulated control signal PWM1 and PWM2.

The apparatus V additionally comprises a first DC voltage transformer unit GW1 and a second DC voltage transformer unit GW2. The two DC voltage transformer units GW1 and GW2 have a shared input potential connection Pe. The two DC voltage transformer units GW1 and GW2 additionally have a shared reference-ground potential connection Pb. This reference-ground potential connection Pb is at ground potential. The first DC voltage transformer unit GW1 has a first output potential connection Pa1. The second DC voltage transformer unit GW2 similarly has a second output potential connection Pa2.

In this case the first input-side voltage connection E1 of the apparatus V and the shared input potential connection Pe of the first and second DC voltage transformer units GW1 and GW2 are a first shared node of the apparatus V in the circuit topology thereof according to Kirchhoff's $1^{st}$ law. The second input-side voltage connection E2 of the apparatus V and the shared reference-ground potential connection Pb of the first and second DC voltage transformer units GW1 and GW2 are similarly a second shared node of the apparatus V. The first output-side voltage connection A1 of the apparatus V and the first output potential connection Pa1 of the first DC voltage transformer unit GW1 form a third shared node of the apparatus V. The second output-side voltage connection A2 of the apparatus V and the second output potential connection Pa2 of the second DC voltage transformer unit GW2 form a fourth shared node of the apparatus V.

The first DC voltage transformer unit GW1 has a first coil L1 and a first controllable switch S1 in a series circuit between the input potential connection Pe and the reference-ground potential connection Pb. The first DC voltage transformer unit GW1 has the first coil L1 and a second controllable switch S2 between the input potential connection Pe and the first output potential connection Pa1. The first DC voltage transformer unit GW1 has the first and second switches S1, S2 in a series circuit between the reference-ground potential connection Pb and the first output potential connection Pa1. Additionally, a first capacitor C1 connected in parallel with the series circuit comprising or consisting of the first and second switches S1, S3 is arranged between the reference-ground potential connection Pb and the first output potential connection Pa1 of the first DC voltage transformer unit GW1.

Hence, the first DC voltage transformer unit GW1 is embodied as an up-converter, wherein the second controllable switch S2 is advantageously arranged between the first coil L1 and the first output potential connection Pa1. The first capacitor C1 comprises a first and a second electrode C1E1 and C1E2. By means of the first electrode C1E1, the first capacitor C1 is electrically connected to the first output potential connection Pa1 directly. By means of the second electrode C1E2, the first capacitor C1 is electrically connected to the reference-ground potential connection Pb directly.

The first and second switches S1 and S2 are embodied as transistors and each have a control signal connection AS1 and AS2, respectively. The control signal connection AS1 of the first switch S1 is electrically connected to the first signal input connection SA1 of the apparatus V directly. By contrast, the control signal connection AS2 of the second switch S2 is electrically connected to the first signal input connection SA1 of the apparatus V via a first inverter IN1. The first inverter IN1 always forwards the first control signal PWM1, which is received at the first signal input connection SA1 of the apparatus V, to the control signal connection AS2 of the second switch S2 in inverted form. As a result, the two switches S1, S2 are always actuated in opposite senses by the same first control signal PWM1.

The second DC voltage transformer unit GW2 has a third controllable switch S3 and a second coil L2 in a series circuit between the input potential connection Pe and the reference-ground potential connection Pb. The second DC voltage transformer unit GW2 has the third controllable switch S3 and a fourth controllable switch S4 in a series circuit between the input potential connection Pe and the second output potential connection Pa2. The second DC voltage transformer unit GW2 has the second coil L2 and the fourth controllable switch S4 in a series circuit between the reference-ground potential connection Pb and the second output potential connection Pa2. In addition, a second capacitor C2 connected in parallel with the series circuit formed by the second coil L2 and the fourth controllable switch S4 is arranged between the reference-ground potential connection Pb and the second output potential connection Pa2.

Hence, the second DC voltage transformer unit GW2 is embodied as an inverse converter, wherein the fourth controllable switch S4 is advantageously arranged between the third switch S3 and the second output potential connection Pa2.

The second capacitor C2 has a first and a second electrode C2E1, C2E2. By means of the first electrode C2E1, the second capacitor C2 is electrically connected to the first reference-ground potential connection Pb directly. By means of the second electrode C2E2, the second capacitor C2 is electrically connected to the second output potential connection Pa2 directly.

The third and fourth switches S3 and S4 are likewise embodied as transistors and each have a control signal connection AS3 and AS4, respectively. The control signal connection AS3 of the third switch S3 is electrically connected to the second signal input connection SA2 of the apparatus V directly. The control signal connection AS4 of the fourth switch S4 is electrically connected to the second signal input connection SA2 of the apparatus V via a second inverter IN2. The second inverter IN2 always forwards the second control signal PWM2, which is received at the second signal input connection SA2 of the apparatus V, to the control signal connection AS4 of the third switch S4 in inverted form. As a result, the two switches S3, S4 are likewise always actuated in opposite senses by the same second control signal PWM2.

Since the apparatus V has been presented in detail, the manner of operation of this apparatus V will now be described in more detail.

It is assumed that the first onboard electrical system branch BZ1 has a rated voltage of 12 volts, which is simultaneously also the potential difference between the input-side voltage connections E1 and E2 of the apparatus V and hence also the potential difference between the input potential connection Pe and the reference-ground potential connection Pb of the first and second DC voltage transformer units GW1, GW2. Since the reference-ground potential connection Pb is at ground potential, the input voltage potential φe at the input potential connection Pe is therefore 12 volts.

From this input voltage potential φe, the apparatus V between the first and second output-side voltage connections A1 and A2 and between the first and second output potential connections Pa1, Pa2 provides an output voltage Ua of above 100 volts. To this end, the apparatus V uses the first and second control connections SA1, SA2 to receive the first and second pulse-width-modulated control signals PWM1, PWM2. The two control signals PWM1, PWM2 each have an identical pulse duration T and an identical duty factor of 4/5.

Under the direct actuation of the first control signal PWM1, the first switch S1 is closed in each switching cycle for a period t1 or 4/5 (duty factor of the first control signal PWM1) of the pulse duration T. During this switched-on phase of the first switch S1, the second switch S2, which is actuated by the inverted first control signal PWM1, is opened. Thus, a first current i11 flows from the input potential connection Pe via the first coil L1 and the closed first switch S1 to the reference-ground potential connection Pb. In this case, the input voltage Ue drops across the first coil L1 and the current i11 through the coil L1 rises linearly. The first coil L1 now stores electric power. After the period t1 has elapsed, the first switch S1 is opened for the remaining period of T−t1 in this switching cycle. During this switched-off phase of the first switch S1, the second switch S2 is closed under the actuation of the inverted first control signal PWM1. A second current i12 now flows from the first coil L1 via the closed second switch S2 to the first capacitor C1. In this case, the energy stored in the first coil L1 is transferred to the first capacitor C1. This energy charges the first capacitor C1. The voltage potential at the first electrode C1E1 of the capacitor C1 and hence also the first output voltage potential φa1 at the first output potential connection Pa1 rises. In each subsequent switching cycle, this charging process for the first capacitor C1 is repeated. Since the second electrode C1E2 of the capacitor C1 is electrically connected to the reference-ground potential connection Pb directly and hence is at ground potential, the first output voltage potential φa1 rises to 60 volts on the basis of the following equation:

$$\phi a1 = \frac{T}{T-t1} x \phi e, \text{ for } \phi b = 0 \text{ volt}; \phi e = 12 \text{ volts}; t1 = \frac{4}{5} xT.$$

Similarly, the third switch S3 is closed for a period t2 of 4/5 (duty factor of the second control signal PWM2) of the pulse duration T of the second control signal PWM2 by means of direct actuation of the second control signal PWM2 in each switching cycle. During this switched-on phase of the third switch S3, the fourth switch S4, which is actuated by the inverted second control signal PWM2, is opened. Thus, a third current i21 flows from the input potential connection Pe via the second coil L2 and the closed second switch S2 to the reference-ground potential connection Pb. In this case, the input voltage Ue drops across the second coil L2 and the current i21 through the coil L2 rises linearly. The second coil L2 now stores electric power. After the period t2 has elapsed, the third switch S3 is opened for the remaining period of T−t2 in this switching cycle. During this switched-off phase of the third switch S3, the fourth switch S4 is closed under the actuation of the inverted second control signal PWM2. A fourth current i22 now flows from the second coil L2 via the closed fourth switch S4 to the second capacitor C2. The energy stored in the second coil L2 is transferred to the second capacitor C2. This energy charges the second capacitor C2. As a result, the electrical voltage between the two electrodes C2E1, C2E2 of the second capacitor C2 and hence also the potential difference between the second output voltage potential φa2 and the reference-ground voltage potential φb rises. Since the first electrode C2E1 of the second capacitor C2, which electrode is electrically connected to the reference-ground potential connection Pb directly, is positively charged by the current i22 and the second electrode C2E2 of the second capacitor C2, which electrode is electrically connected to the second output potential connection Pa2 directly, is negatively charged by the current i22, the second output voltage potential φa2 falls to −48 volts in relation to the reference-ground voltage potential φb on the basis of the following equation:

$$\phi a2 = -\frac{t2}{T-t2} x \phi e, \text{ for } \phi b = 0 \text{ volt}; \phi e = 12 \text{ volts}; t3 = \frac{4}{5} xT.$$

Since the output voltage Ua of the apparatus V is a potential difference between the first and second output voltage potentials φa1, φa2, it is 108 volts (Ua=φa1−φa2=60 volts−(−48 volts)=108 volts). Hence, an onboard electrical system voltage for the second onboard electrical system branch BZ2 is provided that can ensure operation of the loads in this onboard electrical system branch BZ2.

In this case, the contact voltages are 48 volts between the input potential connection Pe and the first output potential connection Pa1, 60 volts between the input potential connection Pe and the second output potential connection Pa2, 60 volts between the reference-ground potential connection Pb and the first output potential connection Pa1 and 48 volts between the reference-ground potential connection Pb and the second output potential connection Pa2. Hence, all of the contact voltages between two onboard electrical system branches BZ1, BZ2 are below or equal to 60 volts and the aforementioned safety requirement is met.

The second and fourth switches S2, S4 change over quickly between an off and an on state and thus contribute to fast and low-loss voltage conversion in comparison with diodes that, according to their components, have a transit time, that is to say an unwanted time delay, in the switching phase between the off and on switching states.

The apparatus V additionally has a first energy store ES1 between the first output potential connection Pa1 and the reference-ground potential connection Pb, and a second energy store ES2 between the reference-ground potential connection Pb and the second output potential connection Pa2, the two energy stores ES1 and ES2 each comprising or consisting of a 48V battery. These two energy stores ES1 and ES2 are used to provide electric power for the electric motor EM. In this case, the charge voltage U_ES1 of the first energy store ES1 can be regulated by the first DC voltage transformer unit GW1. At the same time, the first DC voltage transformer unit GW1 protects the first energy store ES1 from overcharging. Similarly, the second DC voltage transformer unit GW2 regulates the charge voltage U_ES2 of the second energy store ES2 and thus protects the latter from overcharging.

LIST OF REFERENCE SYMBOLS

F Vehicle
BN Onboard electrical system
BZ1, BZ2 Onboard electrical system branch
V Apparatus
Pe Input potential connection
Pb Reference-ground potential connection
Pa1, Pa2 Output potential connection
Ue Input voltage
φe Input voltage potential
φb Reference-ground voltage potential Ua Output voltage
E1, E2 Input-side voltage connection
A1, A2 Output-side voltage connection
φa1, φa2 Output voltage potential
SA1, SA2 Signal input connection
GW1, GW2 DC voltage transformer unit
L1, L2 Coil
S1, S2, S3, S4 Controllable switch
AS1, AS2, AS3, AS4 Control signal connection on the switch
C1, C2 Capacitor
C1E1, C1E2 Electrode of the capacitors
IN1, IN2 Inverter
PWM1, PWM2 Pulse-width modulated control signal
T Pulse duration

What is claimed is:

1. An apparatus for voltage conversion, comprising:
a first transformerless DC voltage transformer unit having a first output potential connection for providing a first output voltage potential,
a second transformerless DC voltage transformer unit having a second output potential connection for providing a second output voltage potential;
wherein the first and the second DC voltage transformer units are arranged in parallel with a shared input potential connection for an input voltage potential, and a shared reference-ground potential connection for a reference-ground voltage potential;
wherein the first DC voltage transformer unit takes the input voltage potential and produces a first output voltage potential at the first output potential connection, wherein the first output voltage potential has a higher voltage potential value with reference to the reference-ground voltage potential, and
wherein the second DC voltage transformer unit takes the input voltage potential and produces a second output voltage potential at the second output potential connection, wherein the second output voltage potential has a lower voltage potential value with reference to the reference-ground voltage potential.

2. The apparatus of claim 1, wherein the first DC voltage transformer unit comprises an up-converter.

3. The apparatus of claim 1, wherein the second DC voltage transformer unit comprises an inverse converter.

4. The apparatus of claim 1, wherein the first DC voltage transformer unit comprises:
a first coil and a first controllable switch in a series circuit between the input potential connection and the reference-ground potential connection,
the first coil and a second controllable switch being in a series circuit between the input potential connection and the first output potential connection, and
the first controllable switch and the second controllable switch being in a series circuit, and wherein a first capacitor is connected in parallel with the series circuit formed by the first and the second switch, between the reference-ground potential connection and the first output potential connection.

5. The apparatus of claim 1, wherein the second DC voltage transformer unit comprises:
a third controllable switch and a second coil in a series circuit between the input potential connection and the reference-ground potential connection,
the third controllable switch and a fourth controllable switch being in a series circuit between the input potential connection and the second output potential connection,
the second coil and the fourth controllable switch being in a series circuit, and wherein a second capacitor is connected in parallel with the series circuit formed by the second coil and the fourth controllable switch, between the reference-ground potential connection and the second output potential connection.

6. The apparatus of claim 4, comprising a first signal input connection for receiving a first pulse-width-modulated control signal for actuating the first and the second switch.

7. The apparatus of claim 6, wherein:
the first or the second switch has a first control signal connection, and
the apparatus has a first inverter for inverting the first control signal between the first signal input connection and the first control signal connection.

8. The apparatus of claim 4, comprising a second signal input connection for receiving a second pulse-width-modulated control signal for actuating the third and the fourth switch.

9. The apparatus of claim 8, wherein:
the third or the fourth switch has a second control signal connection, and
the apparatus has a second inverter for inverting the second control signal between the second signal input connection and the second control signal connection.

10. An onboard electrical system for a vehicle, wherein the onboard electrical system comprises:
a first onboard electrical system branch at a first onboard electrical system voltage,
a second onboard electrical system branch at a second onboard electrical system voltage,
an apparatus for converting the first onboard electrical system voltage into the second onboard electrical system voltage and/or vice versa, wherein the apparatus comprises:
a first transformerless DC voltage transformer unit having a first output potential connection for providing a first output voltage potential,
a second transformerless DC voltage transformer unit having a second output potential connection for providing a second output voltage potential;
wherein the first and the second DC voltage transformer unit are arranged in parallel with a shared input potential connection for applying an input voltage potential, and a shared reference-ground potential connection for applying a reference-ground voltage potential;
wherein the first DC voltage transformer unit takes the input voltage potential and produces a first output voltage potential at the first output potential connection, wherein the first output voltage potential has a higher voltage potential value with reference to the reference-ground voltage potential, and
wherein the second DC voltage transformer unit takes the input voltage potential and produces a second output voltage potential at the second output potential connection, wherein the second output voltage potential has a lower voltage potential value with reference to the reference-ground voltage potential,
wherein the first onboard electrical system voltage is applied between the input potential connection and the reference-ground potential connection, and
wherein the second onboard electrical system voltage is applied between the first output potential connection and the second output potential connection.

11. The onboard electrical system of claim 10, further comprising:

a first energy store between the first output potential connection and the reference-ground potential connection, and a second energy store between the reference-ground potential connection and the second output potential connection, wherein the first DC voltage transformer unit is configured to regulate the charge voltage of the first energy store, and wherein the second DC voltage transformer unit is configured to regulate the charge voltage of the second energy store.

12. A vehicle, comprising:

an onboard electrical system Comprising:
- a first onboard electrical system branch at a first onboard electrical system voltage,
- a second onboard electrical system branch at a second onboard electrical system voltage,
- an apparatus for converting the first onboard electrical system voltage into the second onboard electrical system voltage and/or vice versa, wherein the apparatus comprises:
  - a first transformerless DC voltage transformer unit having a first output potential connection for providing a first output voltage potential,
  - a second transformerless DC voltage transformer unit having a second output potential connection for providing a second output voltage potential;
  - wherein the first and the second DC voltage transformer unit are arranged in parallel with a shared input potential connection for applying an input voltage potential, and a shared reference-ground potential connection for applying a reference-ground voltage potential;
  - wherein the first DC voltage transformer unit takes the input voltage potential and produces a first output voltage potential at the first output potential connection, wherein the first output voltage potential has a higher voltage potential value with reference to the reference-ground voltage potential, and
  - wherein the second DC voltage transformer unit takes the input voltage potential and produces a second output voltage potential at the second output potential connection, wherein the second output voltage potential has a lower voltage potential value with reference to the reference-ground voltage potential,
  - wherein the first onboard electrical system voltage is applied between the input potential connection and the reference-ground potential connection, and
  - wherein the second onboard electrical system voltage is applied between the first output potential connection and the second output potential connection.

13. The vehicle of claim 12, wherein the onboard electrical system further comprises:
- a first energy store between the first output potential connection and the reference-ground potential connection, and
- a second energy store between the reference-ground potential connection and the second output potential connection,
- wherein the first DC voltage transformer unit is configured to regulate the charge voltage of the first energy store, and
- wherein the second DC voltage transformer unit is configured to regulate the charge voltage of the second energy store.

* * * * *